(12) United States Patent
Story et al.

(10) Patent No.: US 7,237,848 B1
(45) Date of Patent: Jul. 3, 2007

(54) BACK AND INTERNAL ORGAN SUPPORTIVE BELT

(76) Inventors: Douglas Story, RD1, Box 346, Brackney, PA (US) 18812; Joseph J. McAulliffe, 333 Hooper Rd., Endwell, NY (US) 13760

(*) Notice: Subject to any disclaimer, the term of this patent is extended or adjusted under 35 U.S.C. 154(b) by 413 days.

(21) Appl. No.: 10/934,006

(22) Filed: Sep. 3, 2004

(51) Int. Cl.
*A62B 35/00* (2006.01)
*A47C 7/42* (2006.01)
*A47C 7/14* (2006.01)

(52) U.S. Cl. .............. 297/485; 297/230.14; 297/284.3; 297/284.5; 297/284.7; 297/464; 297/465; 297/468; 297/488

(58) Field of Classification Search ........... 297/464, 297/487, 485, 284.3, 284.5, 284.7, 284.9, 297/180.11, 217.4, 230.1, 230.11, 230.12, 297/230.13, 230.14
See application file for complete search history.

(56) References Cited

U.S. PATENT DOCUMENTS

| | | | | |
|---|---|---|---|---|
| 514,189 A * | 2/1894 | Harvey et al. | ......... | 297/230.14 |
| 567,096 A * | 9/1896 | Harvey et al. | ......... | 297/230.14 |
| 1,527,754 A * | 2/1925 | Simon | ............... | 297/464 X |
| 2,649,236 A * | 8/1953 | Vaccari et al. | ............... | 297/485 |
| 2,756,809 A * | 7/1956 | Endresen | ............... | 297/284.7 |
| 3,099,486 A * | 7/1963 | Scott | ............... | 297/485 X |
| 3,179,360 A * | 4/1965 | Shelton et al. | ............... | 244/122 B |
| 3,536,357 A * | 10/1970 | Murcott | ............... | 297/485 |
| 3,640,571 A * | 2/1972 | Keropian | ............... | 297/464 |
| 4,022,197 A * | 5/1977 | Castiglia | ............... | 602/61 |
| 4,050,737 A * | 9/1977 | Jordan | ............... | 297/465 |
| 4,073,537 A * | 2/1978 | Hammersburg | ............... | 297/464 |
| 4,093,307 A * | 6/1978 | McLennan | ............... | 297/485 |
| 4,205,670 A * | 6/1980 | Owens | ............... | 297/485 X |
| 4,211,218 A * | 7/1980 | Kendrick | ............... | 602/19 |
| 4,487,201 A * | 12/1984 | Ciambarella et al. | ............... | 606/241 |
| 4,632,425 A * | 12/1986 | Barratt | ............... | 297/485 X |
| 4,637,629 A * | 1/1987 | Cummings | ............... | 297/464 X |
| 4,647,066 A * | 3/1987 | Walton | ............... | 297/284.7 X |
| 4,819,278 A * | 4/1989 | Ramos | ............... | 297/284.5 X |
| 4,862,536 A * | 9/1989 | Pruit | ............... | 297/284.5 |
| 4,898,185 A * | 2/1990 | Fuller | ............... | 297/485 X |
| 4,923,147 A * | 5/1990 | Adams et al. | ............... | 297/464 X |
| 4,979,779 A * | 12/1990 | Williams | ............... | 297/485 X |
| 4,981,307 A * | 1/1991 | Walsh | ............... | 280/290 |
| 5,076,264 A * | 12/1991 | Lonardo et al. | ............... | 602/19 |
| 5,112,106 A * | 5/1992 | Asbjornsen et al. | ............... | 297/284.7 |
| 5,123,427 A * | 6/1992 | Watt et al. | ............... | 128/876 |
| 5,148,563 A * | 9/1992 | Klearman et al. | ............... | 297/485 X |
| 5,154,487 A * | 10/1992 | Warburton | ............... | 297/485 X |
| 5,354,121 A * | 10/1994 | Allum | ............... | 297/485 |
| 5,426,801 A * | 6/1995 | Klearman et al. | ............... | 297/485 X |

(Continued)

*Primary Examiner*—Rodney B. White
(74) *Attorney, Agent, or Firm*—Mark Levy & Associates, PLLC (57) ABSTRACT

A back and internal organ supportive belt that can be installed in a chair or a seat, including the driver's seat of a vehicle or the operator's seat of a piece of equipment, to provide support to internal organs, and to the musculoskeletal system of the driver or operator. The back and internal organ supportive belt includes an inelastic support structure with upper and lower sections; belts and straps for fastening the belt to a seat, and for strapping the driver/operator into the supportive belt; vertically extendable foam lordotic support pads; an inflatable bladder for applying vertical extension and lumbar vertebrae distraction; and a pad for providing heat and/or vibration for the driver's or operator's further comfort.

16 Claims, 7 Drawing Sheets

U.S. PATENT DOCUMENTS

| | | | |
|---|---|---|---|
| 5,447,356 A * | 9/1995 | Snijders | 297/284.3 |
| 5,529,383 A * | 6/1996 | Laco | 297/488 |
| 5,669,671 A * | 9/1997 | Laco | 297/485 |
| 5,915,789 A * | 6/1999 | Ponce De Leon, III | 297/485 X |
| 5,931,539 A * | 8/1999 | Saiz | 297/485 X |
| 6,007,156 A * | 12/1999 | Chang | 297/485 X |
| 6,053,580 A * | 4/2000 | White, Sr. | 297/485 X |
| 6,213,558 B1* | 4/2001 | Axelson et al. | 297/464 |
| 6,378,947 B1* | 4/2002 | Barber et al. | 297/284.7 X |
| 6,564,387 B1* | 5/2003 | Willoughby | 297/180.11 X |
| 6,893,098 B2* | 5/2005 | Kohani | 297/468 |
| 7,073,866 B1* | 7/2006 | Berdahl | 297/485 |
| 7,083,234 B2* | 8/2006 | Dowty et al. | 297/284.3 X |
| 7,134,721 B2* | 11/2006 | Robinson | 297/487 X |
| 7,140,691 B2* | 11/2006 | Kohani | 297/485 |
| 2004/0256899 A1* | 12/2004 | Moore et al. | 297/284.3 |
| 2005/0206214 A1* | 9/2005 | Kosh et al. | 297/464 |

* cited by examiner

BACK AND INTERNAL ORGAN SUPPORTIVE BELT

FIELD OF THE INVENTION

This invention pertains to a back and internal organ supportive belt, and more particularly to a back and internal organ supportive belt that can be installed in a seat or chair, such as the driver's seat of a vehicle or the operator's seat of a piece of heavy construction equipment, to provide support to internal organs, and to provide support to the musculoskeletal system of the driver or operator.

BACKGROUND OF THE INVENTION

Certain driving environments and heavy equipment environments subject the driver of a vehicle or the operator of equipment to extremes of vibration and vertical and lateral forces, that impede the ability of the driver or operator to function effectively. These exposures can be lengthy, involving many hours, entire working shifts, and are often encountered day after day. In addition, consistent, repetitive, and lengthy exposure to the vibrational forces can cause discomfort, and can stress or injure the musculoskeletal structures and internal organs of the driver/operator. Repetitive exposure over days, months, and years can cause cumulative damage to the spine and to the internal organs of the driver/operator. Prolonged sitting alone, without the additional stresses of vibration, increases the pressure on the lower lumbar spine by as much as 10 times due to the mechanics of the body. In the majority of lumbar spine disease conditions, patients report increased pain and/or loss of function associated with prolonged sitting. For these reasons, an appropriate and effective support belt is desirable.

DISCUSSION OF PRIOR ART

In U.S. Pat. No. 5,915,789, issued Jun. 29, 1999 to Ponce De Leon III, for FLEXIBLE AND ADJUSTABLE HARNESS, a device for drivers of cranes and earth moving equipment is illustrated. The harness of this patent is used when it is necessary for a driver of a crane or earth-moving equipment to lean over to view objects such as loads and obstacles directly below his or her seat. Moreover, the patentee asserts that the harness prevents fatigue, risk of fall due to fatigue, and injury to the driver's back and neck muscles due to fatigue.

In U.S. Pat. No. 5,649,744, issued Jul. 22, 1997 to Apodaca for OPERATOR SEAT HARNESS, a device for supporting an operator relative to a seat is illustrated. A pair of torso straps is used, which can be secured to a back of an operator's seat of a crane or the like; and a pair of shoulder straps movably coupled to the torso straps can be secured to the back of the seat, wherein the straps are extended about an operator of the crane to support the operator to reduce fatigue and promote operator comfort.

SUMMARY OF THE INVENTION

In accordance with the present invention, there is provided a back and internal organ supportive belt for installation in a seat or chair, such as the driver's seat of a vehicle or the operator's seat of heavy construction or earthmoving equipment. The back and internal organ supportive belt provides support to the driver/operator's internal organs subjected to vibration, and to the driver/operator's musculoskeletal structure subjected to both vibration and lateral forces. In addition to providing support and comfort, the back and internal organ supportive belt can increase the effectiveness of the driver/operator by stabilizing their position while they are undergoing lateral forces during vehicle or equipment use, thus enabling their manipulation of directional and other vehicle and equipment controls without excessive reliance on their hands and arms to hold them in position in the seat. The back and internal organ supportive belt can also be used with a chair, for instance in an office environment, in order to alleviate the physical stresses on the lumbar portion of the spine caused by prolonged sitting, where the pressure on the lower lumbar spine is increased by as much as 10 times compared to the pressure experienced in a standing position. This is particularly important for individuals with pre-existing sensitivity to these stresses.

The present invention, the back and internal organ supportive belt, combines the effects of abdominal compression, lumbar distraction, and lordotic support in addition to increasing the safety, comfort, and capability of the driver/operator. By attachment to the seat, the back and internal organ supportive belt addresses one of the more common faults of traditional lumbar support belts: deconditioning, whereby prolonged belt use can result in the deconditioning of the supportive musculature. Because the present back and internal organ supportive belt is only worn while seated in the vehicle or equipment seat, it addresses the stress of sitting, while not restricting movement while standing, walking, or lifting, and can be utilized on a permanent basis with no ill effects.

Objectives of the back and internal organ supportive belt include providing compressive support to the internal organs of the operator, thus reducing or eliminating injury resulting from the stresses of extended unsupported exposure to vibration.

An additional objective of the back and internal organ supportive belt is to provide lateral support to the musculoskeletal system, where the resulting lateral support increases operator safety and comfort, reducing fatigue and increasing operator capability to operate in high vibration environments and in environments where the driver or operator is exposed to high force levels.

A further objective of the back and internal organ supportive belt is to provide an adjustable, longitudinal, extending force to the spine, alleviating compression of the spinal column and vertebrae, and counteracting both the effects of long periods of time in a seated position, and the effects of the operator subjection to the vertical compressive forces of his body weight and vibration.

Another objective of the back and internal organ supportive belt is to provide physical and neurological relief to individuals with pre-existing conditions such as disc bulging or herniation, or spinal canal inflammation and apophyseal joints of the lumbar spine by providing a longitudinal extending force to the spine.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

The present invention is a back and internal organ supportive belt for attachment to a chair or a seat, especially the seat of a vehicle or other equipment. The back and internal organ supportive belt consists of an attachment means, which may be a single belt or multiple belts, for attaching the back belt to a chair or seat; an inelastic, rigid, extendable, removable framework, whose vertical dimensions can be slidably adjusted; dense, supportive elastic foam material shaped to conform to the natural curve of the lumbar spine fastened to the framework; an inflatable bladder between the foam material and the framework, for providing vertical force, and thereby lumbar distraction, to the lumbar spine; and a supporting strap for strapping the driver/operator into the back and internal organ supportive belt.

Figure 1:
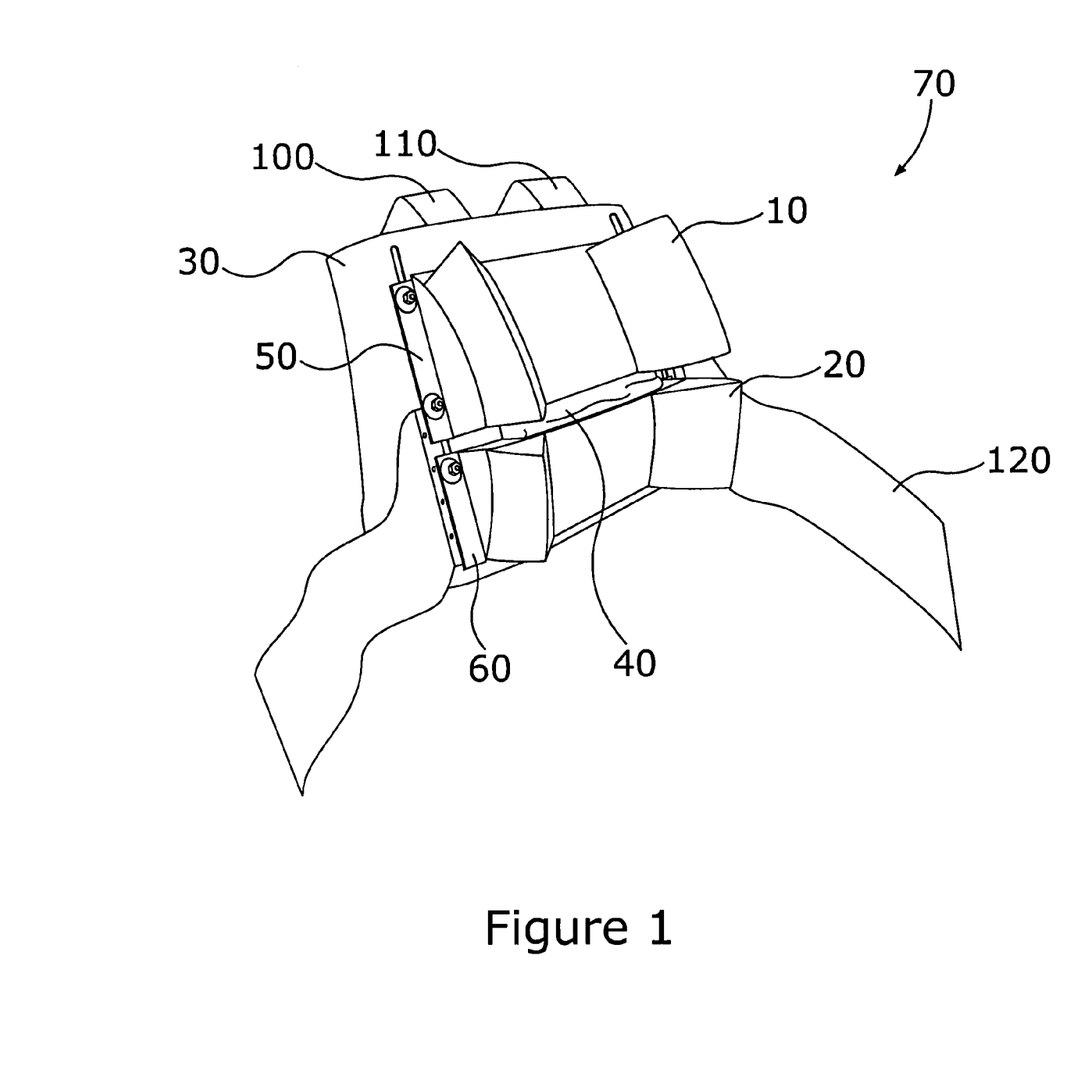
FIG. 1 is a front perspective view of the back and internal organ supportive belt of the invention, showing lordotic support and lumbar distraction features.

Referring to FIG. 1, which is a front perspective view of the back and internal organ supportive belt 70 of the invention, upper and lower lordotic support foam pads 10 and 20, respectively, are shown, fastened to extendable framework 30. Beneath the upper foam pad 10 and the lower foam pad 20, an inflatable bladder 40 is disposed. The lordotic support foam pads 10 and 20 are of firm dense elastomeric foam, providing comfort and support to the lumbar region of the driver/operator, not shown. The inflatable bladder 40 can be inflated to various pressures as appropriate to provide vertical force and vertical extension, and thereby lumbar distraction, to the lumbar spinal column of the driver/operator.

Again referring to FIG. 1, the back and internal organ supportive belt 70 is articulated, consisting of an upper support portion 50 and a lower support section 60, to which are attached the upper lordotic support foam pad 10 and the lower lordotic support foam pad 20. The support portions 50 and 60 are slidably attached to the rigid framework 30, such that the support pads 10 and 20 can be moved by the inflatable bladder 40, in the vertical dimension to accommodate the inflation and deflation of the inflatable bladder 40, altering the vertical extension of the lordotic support pads 10 and 20.

The resulting vertical extension results in an axial separation, or distraction, of the lumbar spinal segments of the driver/operator. This has the effect of creating negative pressure within the intervertebral disc of the spinal segments, which can reduce bulges or herniation in effect much as one can, by manipulating a toothpaste tube, draw the toothpaste back into the tube. The axial separation, or distraction, also opens and decompresses apophyseal joints, releasing pressure on joint surfaces, thereby reducing nociceptive stimulus. Distraction also increases the diameter of the intervertebral foramina relieving pressure on nerve roots associated with inflammation or degenerative disease.

Figure 2:
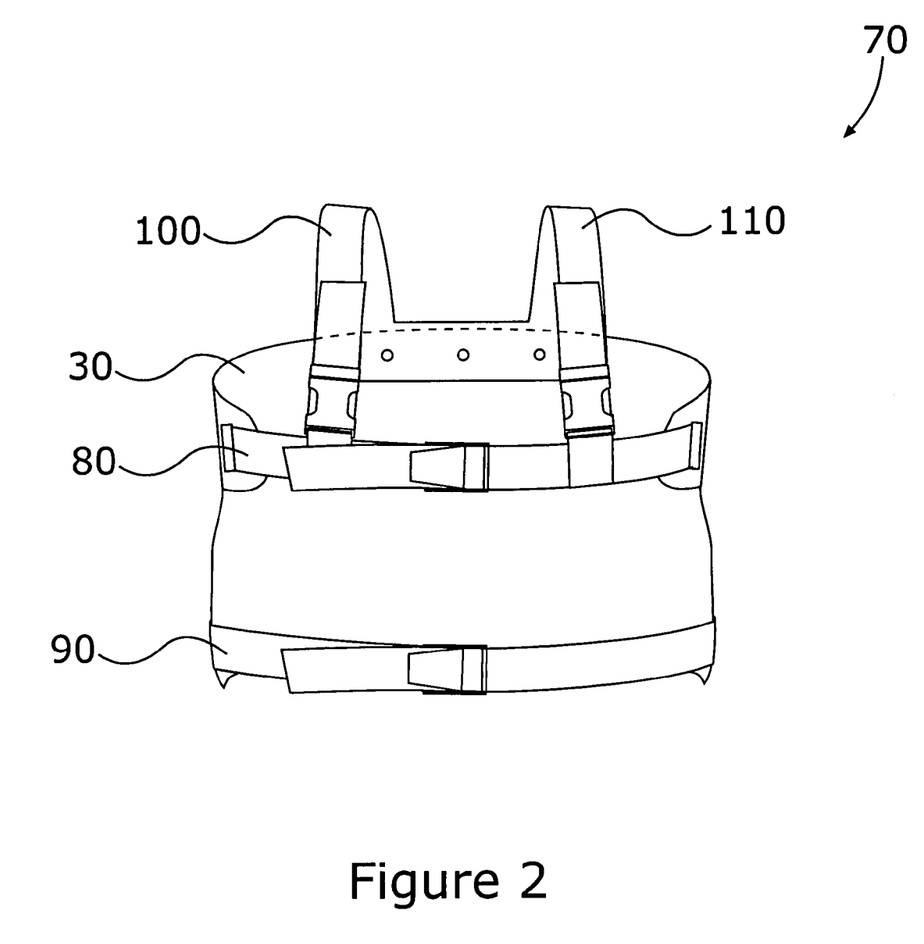
FIG. 2 is a rear perspective view of the back and internal organ supportive belt shown in FIG. 1.

Referring now to FIG. 2, there is shown a rear perspective view of the back and internal organ supportive belt 70 shown in FIG. 1. Belts 80 and 90 horizontally surround the back of a seat (not shown) on which the back and internal organ supportive belt 70 is installed, providing firm attachment of the back and internal organ supportive belt 70 to the seat. Additional belts 100 and 110 are also shown. These belts 100 and 110 vertically surround the back of the seat, and permit the back and internal organ supportive belt 70 to be positively located at a selected height relative to the base of the seat. Together, these belts 80, 90, 100, and 110 provide firm attachment, suitable to maintain the physical connection of the back and internal organ supportive belt 70 to the seat during exposure to vibration and vertical and horizontal forces.

Figure 3:
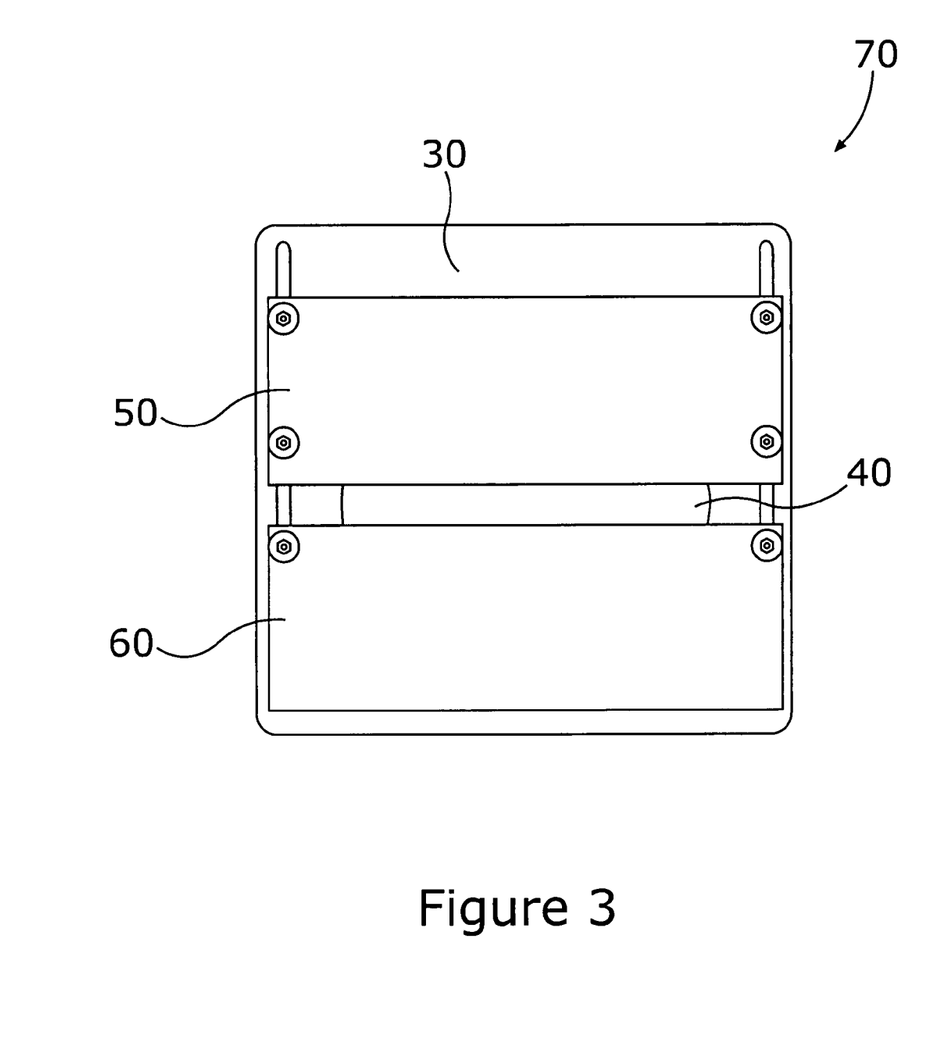
FIG. 3 is a detailed view of the extendable feature of the rigid framework of the back and internal organ supportive belt shown in FIG. 1.

Referring now to FIG. 3, a detailed view of the vertical adjustability feature of the back belt 70 is shown. Upper and lower support sections 50 and 60 are attached to the rigid support structure 30. This feature allows the upper and lower support sections 50 and 60 to move vertically when acted upon by the inflatable bladder 40.

Figure 4:
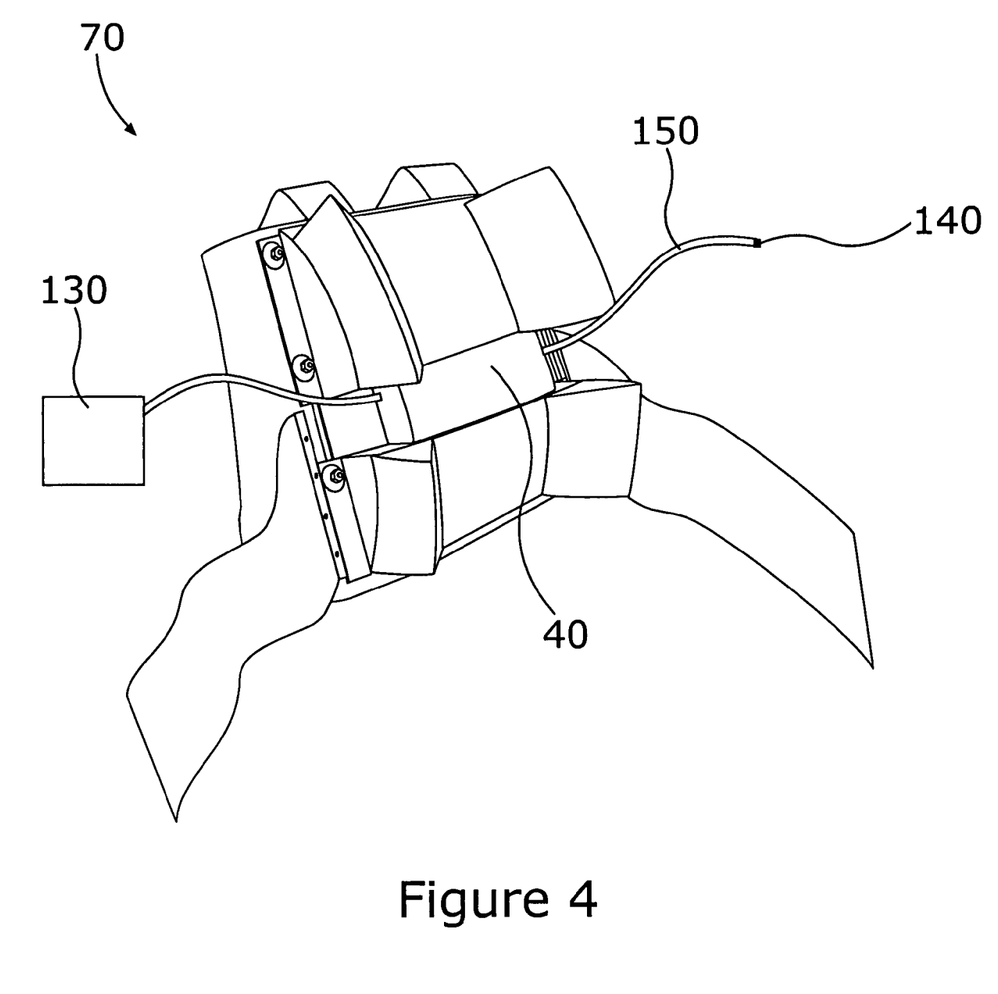
FIG. 4 is a detailed view of an alternate implementation of the back and internal organ supportive belt, showing an electric pump used with the lordotic distraction feature.

Referring now to FIG. 4, there is shown a detailed view of an alternate implementation lordotic distraction feature. Inflatable bladder 40 is inflated in this implementation by an electric air pump 130 powered by the electrical system of the vehicle or equipment in which the back and internal organ supportive belt 70 is installed. The electric air pump 130 is a commercially available device, widely distributed and well known to those skilled in the art. In addition, a pressure relief valve 140 is shown operatively attached to the end of tube 150 that is connected to the inflatable bladder. The pressure relief valve 140 is used to release air from the inflatable bladder 40, fine tuning the vertical force and vertical extension, and thereby the lumbar distraction applied to the lumbar spine of the driver/operator. The pressure relief valve 140 is a commercially available device, widely distributed and well known to those skilled in the art.

Figure 5:
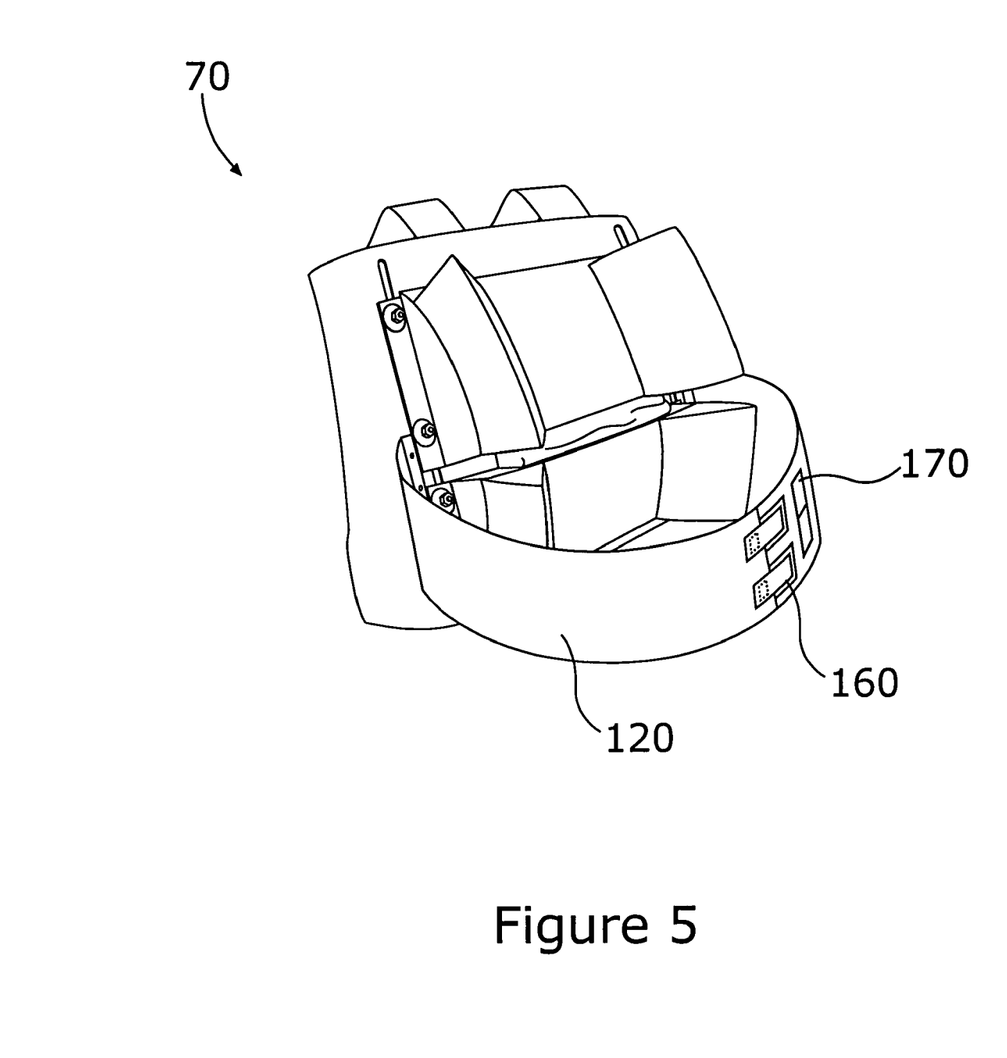
FIG. 5 is a detailed view of the belt to attach a driver/operator to the back and internal organ supportive belt.

Referring now to FIG. 5, there is shown a detailed view of a belt 120 used to attach a driver/operator to the back and internal organ supportive belt 70. The belt 120 may be constructed of an inelastic woven fabric, or similar material, fastened by a standard hook and loop fastener 160. The hook and loop fastener 160 is chosen to be of a commercial grade suitable to support firm tension in the belt 120. The width of the belt 120 is chosen to provide support across the abdomen of the driver/operator, and may be approximately between 6 and 12 inches wide, providing comfortable support, in contrast to the narrow customary seat belt in a vehicle.

Figure 6:
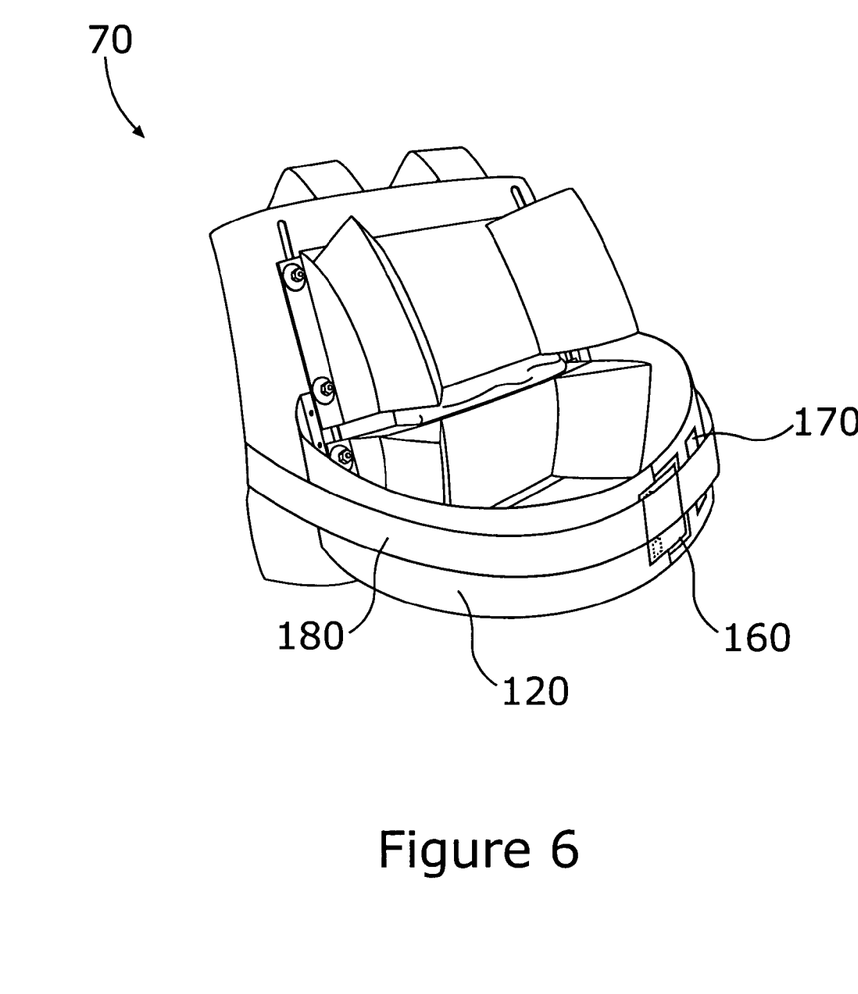
FIG. 6 is a detailed view of the belt to attach a driver/operator to the back and internal organ supportive belt, showing the attachment of the shoulder belt portion of a vehicle seat and shoulder belt to the belt attaching the driver operator to the supportive belt.

Also shown in FIGS. 5s and 6 is a belt loop 170 which is fastened on the left side of belt 120. This belt loop 170 may be used by threading the seat belt portion 180, shown in FIG. 6, of the vehicle seat and shoulder belt through the loop 170 so that the left side of belt 120 is moved to the side when the belt 120 are unfastened and the vehicle seat and shoulder belt is unfastened, allowing convenient entry and egress for the driver/operator from the combined belts. The belt loop 170 includes two portions fastened by a snap, a hook and loop fastener, or other fastening means well known in the art, making it easy for the driver/operator to attach the vehicle seat and shoulder belt, which is not part of the present invention, to the belt 120. Only the seat belt portion 180 of the vehicle seat and shoulder belt is shown in FIG. 6.

The driver/operator using the back and internal organ supportive belt 70 will typically fasten the belt 120 around his abdomen, and subsequently inflate the inflatable bladder 40 to a comfortable level of inflation to provide firm abdominal compression and lumbar spine distraction.

Figure 7:
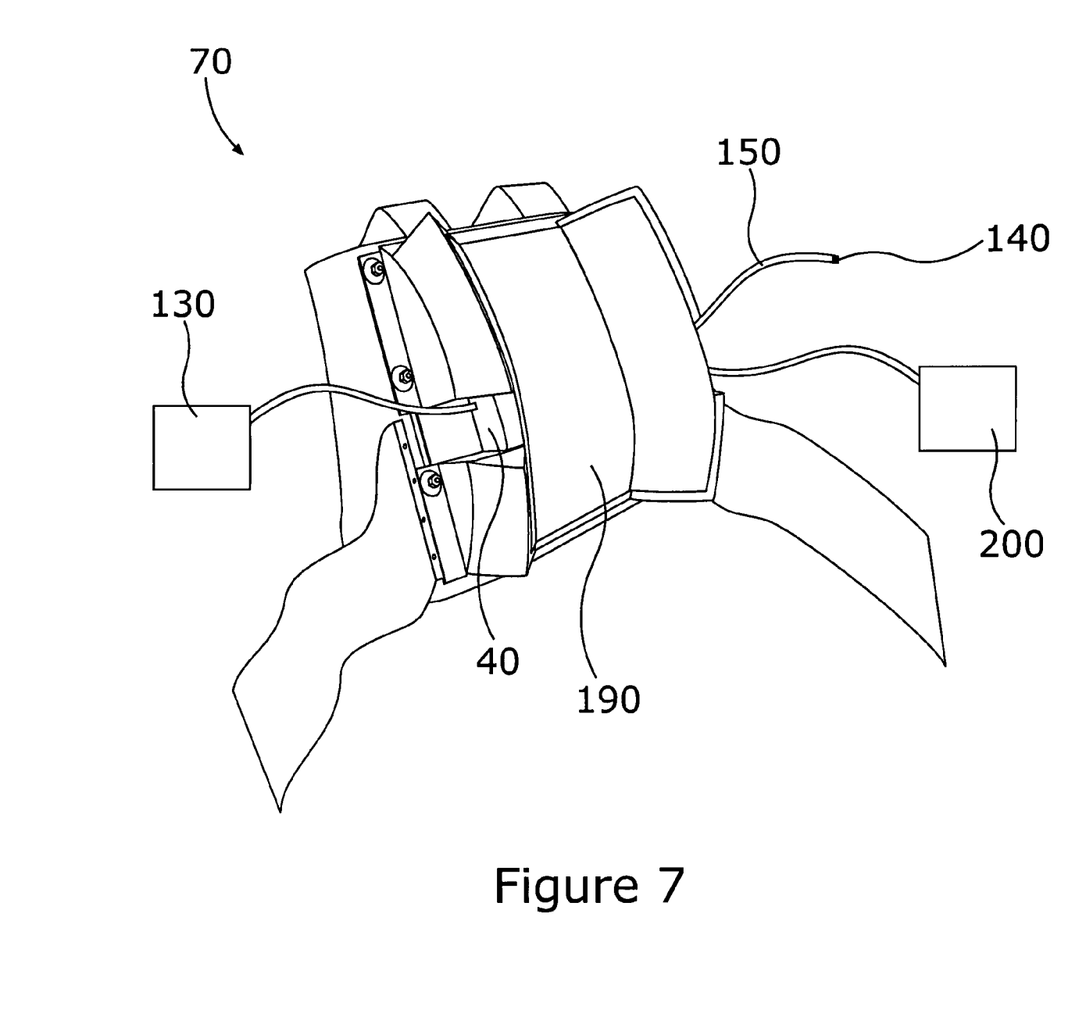
FIG. 7 is a detailed view of an alternate implementation of the back and internal organ supportive belt, showing a pad providing heat and/or vibration for the further comfort of the driver/operator.

Referring now to FIG. 7, there is shown a detailed view of another embodiment of the back and internal organ supportive belt 70. A pad 190 covers the upper lordotic support foam pad 10 and the lower lordotic support foam pad 20. The pad 190 provides adjustable heat and vibration at the interface between the driver/operator and the upper and lower lordotic support foam pads 10 and 20, for the further comfort of the driver/operator. The pad 190 is a commercially available device, widely distributed and well known to those skilled in the art. The pad 190 is controlled by a suitable controller 200, which is powered by the electrical system of the vehicle in which the back and internal organ support belt is installed.

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of the invention.

Having thus described the invention, what is desired to be protected by Letters Patent is presented in the subsequently appended claims.

What is claimed is:

1. A back and internal organ supportive belt for attachment to a seat, comprising:
    a) an inelastic, rigid, extendable, removable framework, having upper and lower sections;
    b) means for firmly attaching said inelastic rigid extendable framework to a seat;
    c) means for snugly strapping a driver/operator into the back and internal organ supportive belt, said strapping means providing increased interabdominal pressure on said driver/operator;
    d) means for performing distraction to the lumbar vertebrae of said driver/operator comprising:
        i) an inflatable bladder operatively attached to said upper and lower sections of said inelastic, rigid, extendable, removable, framework, inflation of said inflatable bladder causing separation of said upper and said lower sections of said frame; and
        ii) a slidable operative attachment between said upper and lower sections and said inelastic, rigid, removable, extendable framework, providing vertical extension of said upper and lower sections; and
    e) means for providing lordotic support to the lumbar spine of said driver/operator.

2. The back and internal organ supportive belt in accordance with claim 1, wherein said means for firmly attaching said inelastic, rigid, extendable, removable framework to said seat further comprises:
    f) at least one inelastic belt operatively attached to said inelastic, rigid, extendable, removable framework, and at least partially enclosing said seat.

3. The back and internal organ supportive belt in accordance with claim 1, wherein said means for snugly strapping said driver/operator into said back and internal organ supportive belt further comprises:
    f) an adjustable belt having two portions, a left portion with respect to the driver/operator, and a right portion with respect to the driver/operator, with fastening means, operatively attached to said inelastic, rigid, extendable, removable framework, wherein said adjustable belt fastening means provides means for adjusting tension on said adjustable belt.

4. The back and internal organ supportive belt in accordance with claim 3, wherein said means for snugly strapping said driver/operator into said back and internal organ supportive belt further comprises:
    g) a fastenable belt loop operatively attached to the left portion of and orthogonal to the length of said adjustable belt, sized to encompass the seat belt portion of a vehicle seat and shoulder belt, allowing said seat belt portion and said adjustable belt to be operatively connected and moved together, thereby facilitating entry to and egress from said back and internal organ supportive belt.

5. The back and internal organ supportive belt in accordance with claim 1, wherein said means for providing lordotic support to the lumbar spine of said driver/operator further comprises:
    f) elastic foam material shaped to conform to the natural curve of the lumbar spine, operatively fastened to said inelastic, rigid, removable, extendable framework.

6. The back and internal organ supportive belt in accordance with claim 5, wherein said elastic foam material further comprises:
    g) means for providing adjustable heat and vibration at the interface between said driver/operator and said elastic foam material, said means comprising a pad with electrically powered vibration and heating means operatively connected to a controller powered by the electrical system of said vehicle.

7. The back and internal organ supportive belt in accordance with claim 1, wherein said inflatable bladder further comprises a squeeze bulb and a check valve to apply pressurized air to inflate said inflatable bladder.

8. The back and internal organ supportive belt in accordance with claim 1, wherein said inflatable bladder further comprises an electrically powered pump with an on/off switch, powered by the electrical system of said vehicle, to apply pressurized air to said inflatable bladder.

9. The back and internal organ supportive belt in accordance with claim 1, wherein said inflatable bladder further comprises a valve for controlling inflation by selectively releasing air from said inflatable bladder.

10. A back and internal organ supportive belt for attachment to a seat, comprising:
    a) an inelastic, rigid, extendable framework, having upper and lower sections;
    b) at least one inelastic belt operatively attached to said inelastic, rigid, extendable framework, and at least partially enclosing and firmly attached to said seat;
    c) an adjustable belt with fastening means, operatively attached to said inelastic, rigid, extendable, removable framework, wherein said adjustable belt fastening means provides means for adjusting tension on said adjustable belt, for snugly strapping a driver/operator into the back and internal organ supportive belt, providing increased interabdominal pressure on said driver/operator;
    d) an inflatable bladder operatively attached to said upper and lower sections of said inelastic, rigid, removable, extendable framework, inflation of said inflatable bladder causing separation of said upper and said lower sections of said frame;
    e) a slidable operative attachment between said upper and lower sections and said inelastic, rigid, removable, extendable framework, providing vertical extension of said upper and lower sections to perform distraction to the lumbar vertebrae of said driver/operator; and f) elastic foam material shaped to conform to the natural curve of the lumbar spine, operatively fastened to said inelastic, rigid, removable, extendable framework, said elastic foam material providing lordotic support to the lumbar spine of said driver/operator.

11. The back and internal organ supportive belt in accordance with claim 10, wherein said inflatable bladder further comprises a squeeze bulb and a check valve to apply pressurized air to inflate said inflatable bladder.

12. The back and internal organ supportive belt in accordance with claim 10, wherein said inflatable bladder further comprises an electrically powered pump with a on/off switch, powered by the electrical system of said vehicle, to apply pressurized air to said inflatable bladder.

13. The back and internal organ supportive belt in accordance with claim 10, wherein said inflatable bladder further comprises a valve for controlling inflation by selectively releasing air from said inflatable bladder.

14. A method of providing interabdominal compression, lumbar distraction, and lordotic support to the driver/operator of a vehicle, the steps comprising:

a) providing a back and internal organ supportive belt, comprising: an inelastic, rigid, extendable, removable framework, having upper and lower sections; means for firmly attaching said inelastic rigid extendable framework to a seat; means for snugly strapping a driver/operator into the back and internal organ supportive belt, said strapping means providing increased interabdominal pressure on said driver/operator; means for performing distraction to the lumbar vertebrae of said driver/operator comprising: an inflatable bladder operatively attached to said upper and lower sections of said inelastic, rigid, removable, extendable framework, inflation of said inflatable bladder causing separation of said upper and said lower sections of said frame; and a slidable operative attachment between said upper and lower sections and said inelastic, rigid, removable, extendable framework, providing vertical extension of said upper and lower sections; and means for providing lordotic support to the lumbar spine of said driver/operator;

b) attaching said back and internal organ supportive belt to a seat;

c) attaching said driver/operator to said back and internal organ supportive belt by means of a snug strapping attachment, said snug strapping attachment providing increased interabdominal pressure on said driver/operator;

d) distracting the lumbar vertebrae of said driver/operator; and e) supporting the lumbar spine of lordotically said driver/operator.

15. The method of providing interabdominal compression, lumbar distraction, and lordotic support as recited in claim 14, the steps further comprising:

f) regulating the amount of extendable distraction to the lumbar vertebrae of said driver/operator by one of the following techniques: manually and electrically.

16. The method of providing interabdominal compression, lumbar distraction, and lordotic support as recited in claim 14, the steps further comprising:

f) providing vibration and heating for further comfort of said driver/operator.

\* \* \* \* \*